United States Patent
Namuduri et al.

(10) Patent No.: US 9,973,134 B1
(45) Date of Patent: May 15, 2018

(54) ELECTRICAL SYSTEM WITH REVERSE CURRENT PROTECTION CIRCUIT

(71) Applicant: GM GLOBAL TECHNOLOGY OPERATIONS LLC, Detroit, MI (US)

(72) Inventors: Chandra S. Namuduri, Troy, MI (US); Rajeev Vyas, Rochester Hills, MI (US); Suresh Gopalakrishnan, Troy, MI (US); Mark J. Rychlinski, Farmington Hills, MI (US); Markus Demmerle, Nieder-Olm (DE); Varsha K. Sadekar, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/451,898

(22) Filed: Mar. 7, 2017

(51) Int. Cl.
| | |
|---|---|
| *G05B 5/00* | (2006.01) |
| *H02H 7/08* | (2006.01) |
| *H02P 1/04* | (2006.01) |
| *H02P 3/00* | (2006.01) |
| *H02P 7/00* | (2016.01) |
| *H02P 29/024* | (2016.01) |
| *H02P 27/06* | (2006.01) |
| *H02P 6/08* | (2016.01) |
| *B60L 11/18* | (2006.01) |
| *B60L 3/00* | (2006.01) |

(52) U.S. Cl.
CPC .......... *H02P 29/027* (2013.01); *B60L 3/0061* (2013.01); *B60L 11/1803* (2013.01); *H02P 6/08* (2013.01); *H02P 27/06* (2013.01)

(58) Field of Classification Search
CPC ... H02P 29/027; B60L 3/0061; B60L 11/1803
USPC ........................................................ 318/478
See application file for complete search history.

(56) References Cited

U.S. PATENT DOCUMENTS

| | | | |
|---|---|---|---|
| 2010/0066292 A1* | 3/2010 | Gottemoller | ............ H02P 23/14 318/472 |
| 2011/0234126 A1* | 9/2011 | Meyer, III | .......... H02P 29/0241 318/400.3 |
| 2017/0264284 A1* | 9/2017 | Xu | ....................... B60L 11/1803 |

* cited by examiner

*Primary Examiner* — Erick Glass
(74) *Attorney, Agent, or Firm* — Quinn IP Law

(57) ABSTRACT

An electrical system includes a direct current (DC) voltage bus, a power supply providing a supply voltage to the DC voltage bus, an electric machine connected to the power supply, a reverse current protection (RCP) circuit positioned between the power supply and the electric machine, the RCP circuit including an energy dissipating element, and a controller. As part of an associated method, the controller detects a reverse current condition in which a current flows from the electric machine toward the power supply when an induced voltage of the electric machine exceeds a voltage level of the voltage bus. The controller transmits a control signal to the RCP circuit to direct the electrical current through the energy dissipating element for a duration of the reverse current condition or for a predetermined duration equal to or greater than that of the reverse current condition.

19 Claims, 4 Drawing Sheets

ELECTRICAL SYSTEM WITH REVERSE CURRENT PROTECTION CIRCUIT

INTRODUCTION

In a torque-speed profile of an electric machine with fixed magnetic excitation flux, a maximum rotational speed point exists at which zero torque is generated by the electric machine. Such a speed is referred to as the electric machine's no-load speed. At the no-load speed, a supply voltage to the electric machine is essentially equal to the electric machine's induced voltage/back electromotive force (back-EMF). Thus, the no-load speed may be thought of as the maximum rotational speed of the electric machine for a given supply voltage. However, an electric current output of the electric machine may be controlled to oppose the excitation flux and effectively reduce the net back-EMF, and thereby selectively permit the electric machine to rotate faster than its no-load speed when so required. This mode of operating an electric machine is known as the "field weakening mode".

For example, an electric machine embodied as a polyphase electric motor has a phase angle of one or more phase currents supplied to a corresponding number of phase windings of the electric machine. The phase angles may be adjusted to achieve a desired field weakening effect. However, if a given field weakening current is suddenly lost at rotational speeds in excess of the no-load speed, an induced voltage due to the full excitation flux may result in a voltage level that is significantly higher than the applied voltage.

If such events occur during operation of the electric machine, a voltage spike or "overvoltage" condition may result such that a voltage level on a direct current (DC) voltage bus, i.e., the bus voltage, temporarily exceeds a supply voltage from a DC battery pack, fuel cell, or other DC power supply. Example events include a sudden loss of drive signals or directional reversal of the electric machine and a transient change in rotational speed. Certain faults occurring when the electric machine operates above its no-load speed may also result in similar voltage spikes. Regardless of root cause, a reverse current or "negative current" condition may at times result in the electrical circuit, with the reverse electrical current potentially reaching the power supply and other connected components.

SUMMARY

An electrical system as described herein is configured to protect a power supply, such as a multi-cell direct current (DC) battery pack, and other sensitive circuit components from the reverse current condition noted above. The reverse current condition may result in an undesirable voltage spike on a DC voltage bus of the electrical system. The electrical system includes a reverse current protection (RCP) circuit that includes one or more energy dissipating elements, such as a resistor, a capacitor bank, or a set of semiconductor switches in various embodiments. The RCP circuit is automatically connected to a current flow path within the electrical circuit in response to detection of the reverse current condition. Connection of the energy dissipating element(s) absorbs and dissipates stored energy from the electric machine in lieu of allowing such energy to be transmitted back through the electrical system to the power supply.

Various alternative configurations are suitable for detecting and preventing overvoltage conditions at input drive terminals of the electrical system. The present approach may be used in certain example top-level systems such as vehicles, stationary electrical systems, power generation plants, robots, mobile platforms, or other electromechanical or electrical systems in which back-EMF or induced voltage of the electric machine may, at undesirable times, release energy from the electric machine back to the power supply. Therefore, proper handling of the voltage spikes via control of the RCP circuit in the manner set forth herein may be used to protect the voltage supply and other sensitive circuit components during the reverse current condition.

In an example embodiment, the electrical system includes a DC voltage bus, the power supply, and the electric machine, with the electric machine being connected to the power supply via the DC voltage bus and, in some embodiments, a power inverter module (PIM). The electrical system also includes the RCP circuit, which is positioned on the DC voltage bus between the power supply and the PIM/electric machine. The RCP circuit includes the energy dissipating element(s). A master switch may be used to electively connect the power supply to the electric machine.

As part of such an embodiment, a controller in communication with the RCP circuit detects the reverse current condition, i.e., a condition in which an electrical current tends to flow away from the electric machine and toward the power supply when such reverse power flow is not desirable. The controller may be programmed to transmit a control signal to actively-controlled elements of the RCP circuit in response to detection of the reverse current condition so as to cause the electrical current to flow through the energy dissipating element(s). Such a control action may be sustained for the duration of the reverse current condition. Thus, control of the master switch may be closely coordinated with control of the RCP circuit to ensure that energy dissipating control actions occur when the power supply is disconnected.

A method is also disclosed for protecting the electrical system from the reverse current condition. In a possible embodiment, the method includes detecting the reverse current condition via a controller, and then opening a master switch to selectively disconnect the power supply from the DC voltage bus. A control signal is transmitted to the RCP circuit via the controller to direct a flow of the electrical current, via operation of the RCP circuit, through the energy dissipating element for the duration of the reverse current condition.

The above-noted and other features and advantages of the present disclosure are readily apparent from the following detailed description of the best modes for carrying out the disclosure when taken in connection with the accompanying drawings.

DETAILED DESCRIPTION

Figure 1:
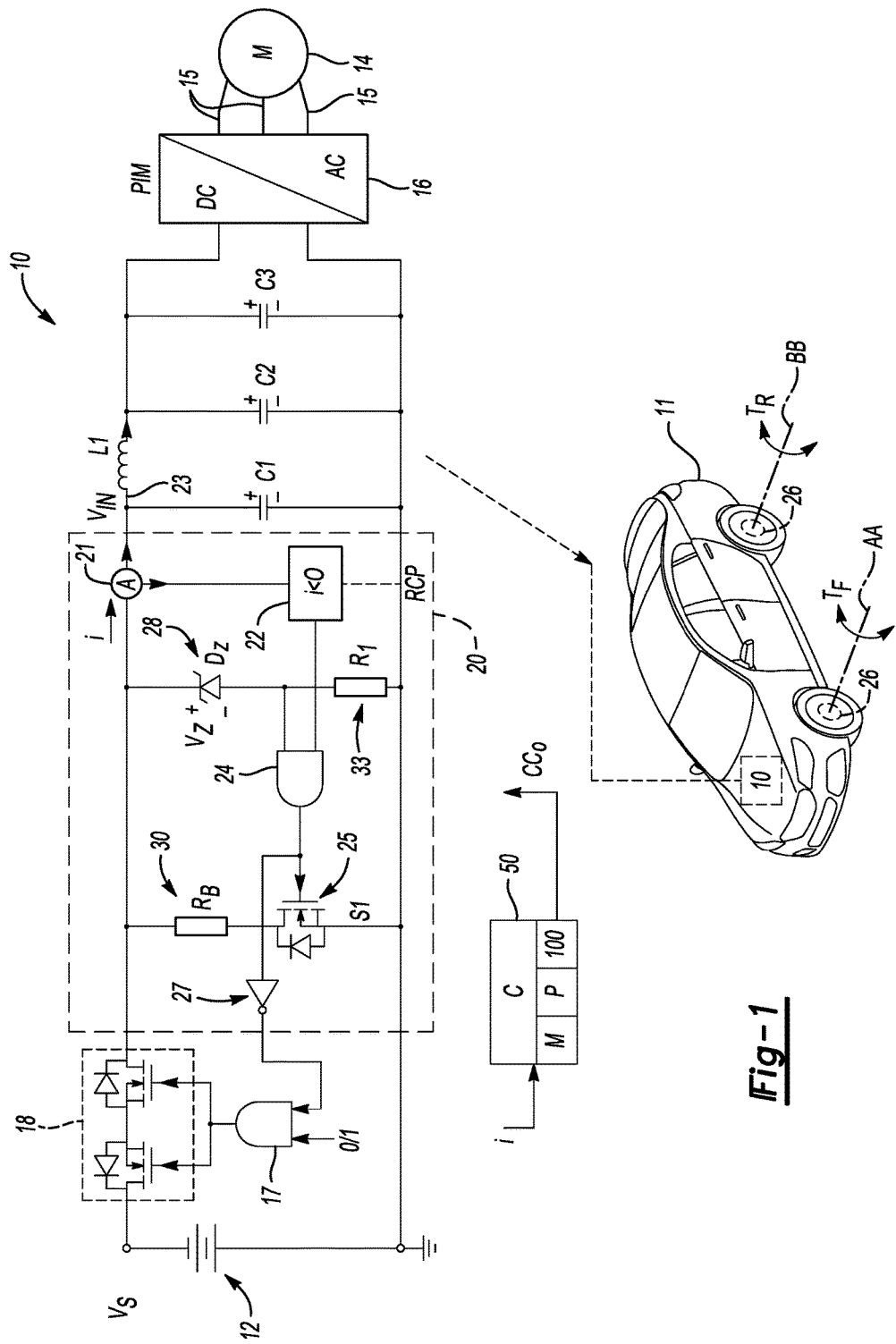
FIG. 1 is a schematic circuit diagram of an example vehicle having an electrical system with a reverse current protection (RCP) circuit according to a possible switching embodiment.

Referring to the drawings, wherein like reference numbers refer to the same or similar components throughout the several views, an example electrical system 10 is shown in FIG. 1 that is usable aboard a vehicle 11 or other top-level system. An electric machine (M) 14, i.e., a traction motor or a motor/generator unit, may be used to generate torque for propelling the vehicle, for generating electricity, and/or for powering a particular component of the vehicle. For example, the electric machine 14 may be connected to a respective front or rear drive axle AA or BB of the vehicle 11, or both, and configured to generate a respective front or rear torque (arrows $T_F$ and $T_R$) at a level suitable for propelling the vehicle. In another possible embodiment, the electric machine 14 may be connected to a hydraulic brake boost system 26 configured to generate a braking force at a level suitable for slowing the vehicle 11 during a braking maneuver. The electric machine 11 thus may be configured to generate braking torque at a level suitable for slowing or stopping the vehicle during an assisted braking maneuver, e.g., as part of an anti-lock braking system maneuver. Other possible applications include that of a power steering motor or an active suspension motor, while non-vehicular applications may include stationary power plants, robots, mobile platforms, or other top-level systems in which, at times, voltage spikes may lead to negative current/reverse current condition in the electrical system 10.

That is, the electric machine 14 may inject negative current into and thereby induce a voltage spike on a direct current (DC) power bus 23 of the electrical system 10, e.g., when the electric machine 14 quickly changes speed or the field control is lost when the electric machine 14 is running above the no-load speed. Such voltage spikes may occur when the electric machine 14 is used aboard the vehicle 11 to power an extended anti-lock braking system maneuver. A hard voltage threshold may be set in some vehicles 11, above which sensitive onboard controllers or monitoring circuits are automatically rebooted or shut down to prevent damage. As a result, there is a need to properly handle back-feeding of an electrical current (arrow i) into the electrical system 10 of FIG. 1. A possible solution to such a problem is described below with further references to FIGS. 2-6B.

The electrical system 10 of FIG. 1 includes a DC power supply 12, such as a multi-cell battery pack or a fuel cell, with the power supply 12 feeding a supply voltage (Vs) into the electrical system 10. The electric machine 14 is electrically connected to the power supply 12 via the DC voltage bus 23. When the electric machine 14 is embodied as a polyphase induction motor, a permanent magnet synchronous motor, or another polyphase machine, the electrical system 10 may also include a power inverter module (PIM) 16 operable for converting DC power from the DC voltage bus 23 into alternating current (AC) power suitable for powering the individual phase windings 15 of the electric machine 14.

The PIM 16, which is electrically connected to both the power supply 12 and the electric machine 14, is in communication with and controllable via a controller (C) 50. While shown separately from the PIM 16 for clarity, the PIM 16 may also include various internal electronic components, including a set of parallel link capacitors (C1, C2, and C3) each having a calibrated capacitance, an inductor (L1) having a calibrated inductance, and a current sensor (A) 21 such as a current shunt plus amplifier or a linear Hall effect sensor, as well as transistors, diodes, and conductors (not shown) as needed for converting and filtering power aboard the DC voltage bus 23. The current sensor 21 may be positioned on the negative rail of the DC voltage bus 23 instead of the positive rail as shown without departing from the disclosed inventive scope.

Figure 2:
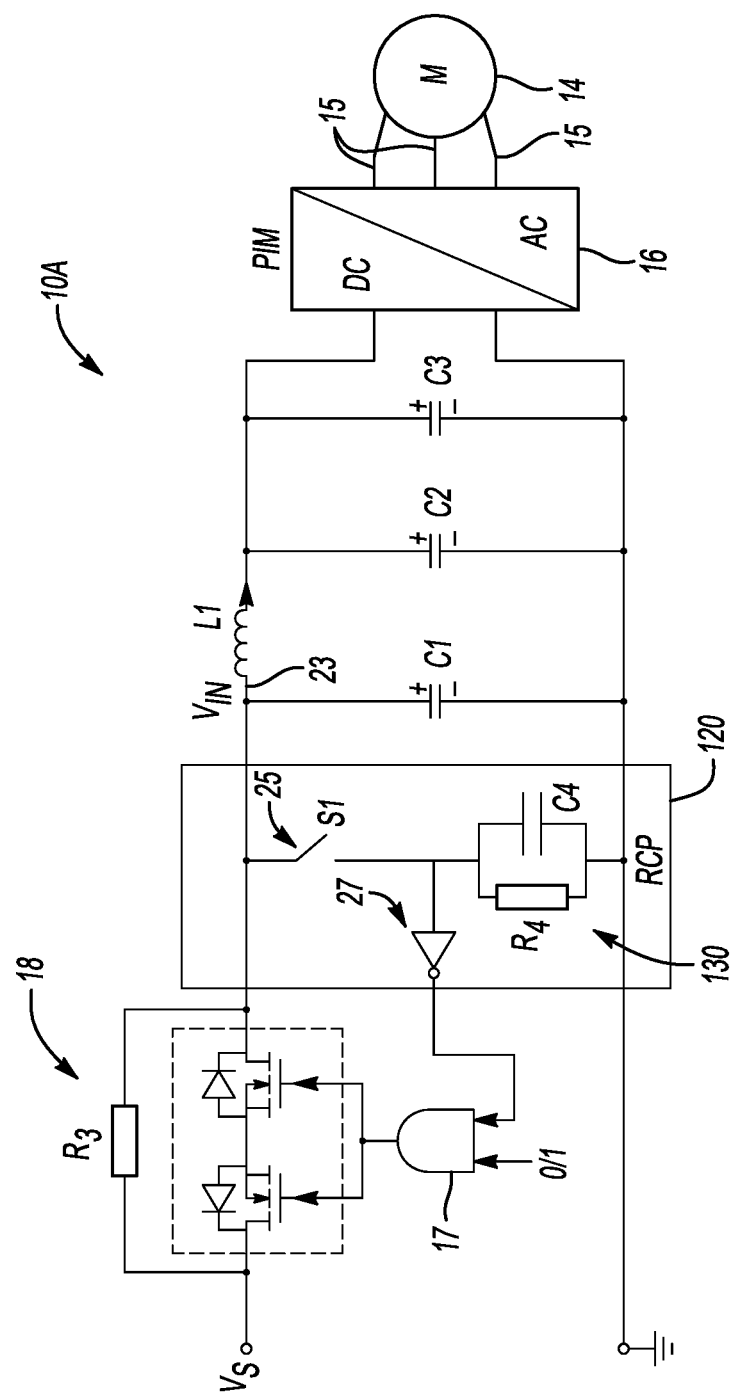
FIG. 2 is a schematic illustration of an embodiment of an RCP circuit having an alternative capacitor bank configuration.
Figure 3:
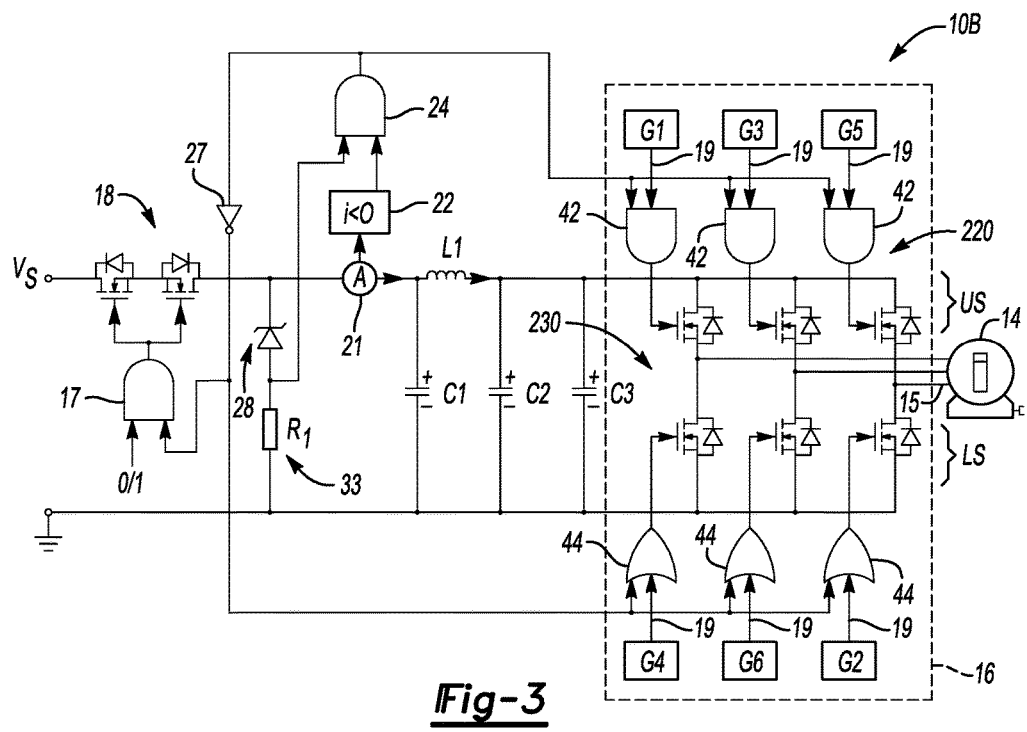
FIG. 3 is a schematic illustration of another alternative embodiment of the RCP circuit in which the energy dissipating element includes semi-conductor switches of a power inverter module.
Figure 4:
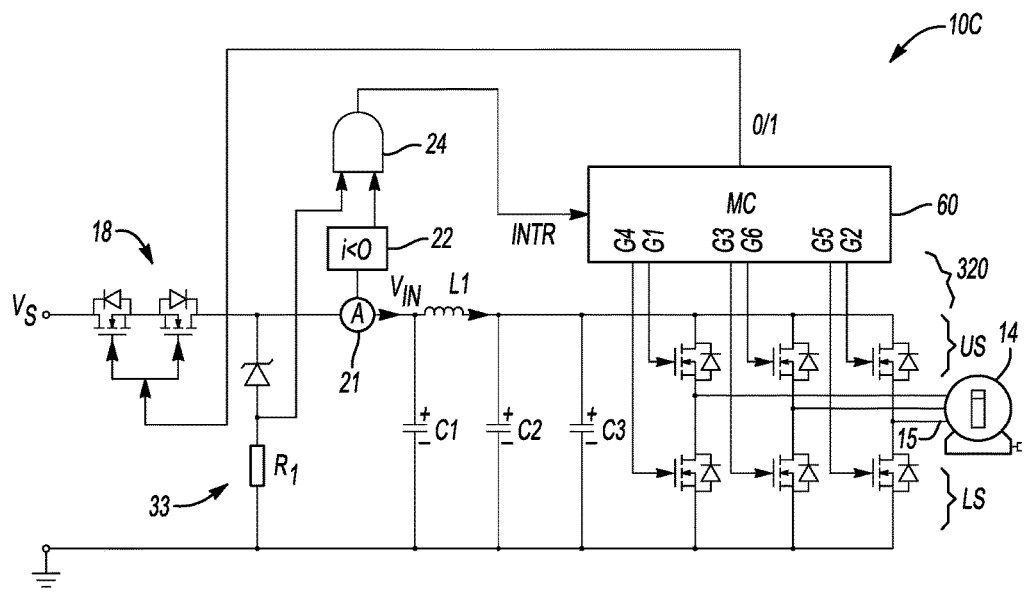
FIG. 4 is a schematic illustration of an alternative embodiment to that shown in FIG. 3 in which a microcontroller is used in lieu of logic gates to control the energy-dissipating switching operation of the power inverter module.

While omitted from FIGS. 1 and 2 for illustrative clarity and simplicity, the PIM 16 contains semiconductor switches as best shown in FIGS. 3 and 4, the switching states of which are actively controlled to produce a desired voltage waveform. Such switches may be arranged in upper and lower switching devices or pairs to control the power conversion function of the PIM 16. For a non-limiting example three-phase embodiment of the electric machine 14 of FIGS. 1-4, for instance, three such switching devices may be used, with two switching devices per electrical phase for a total of six semiconductor switches as depicted in FIG. 3.

A master switch 18 controlled through an AND logic gate 17 may be disposed between the power supply 12 and the electric machine 14. The master switch 18 may be configured to selectively disconnect the power supply 12 from the DC voltage bus 23 during certain threshold operating conditions, such as when the vehicle 11 is shut down after a key-off event or in response to an electrical fault. In this manner, the master switch 18 may provide a main on/off (e.g., 0/1 binary) control function for the electrical system 10. In an example embodiment, the master input switch 18 may be embodied as back-to-back MOSFET devices as shown to create an example bidirectional solid-state switch with bi-directional current and voltage blocking capability, or as other suitable mechanical or semiconductor switching elements providing the same desired switching function.

The electrical system 10 of FIG. 1 and the various alternative embodiments shown in FIGS. 2-6B includes a reverse current protection (RCP) circuit 20 positioned between the power supply 12 and the PIM 16. The RCP circuit 20 includes one or more energy dissipating elements 30, shown in FIG. 1 as an example resistor ($R_B$) according to a particular embodiment, in this particular instance a bleeding resistor. A bleeding resistor as used herein is a circuit resistive element configured to drain a stored charge, in this case from the electric machine 14, when connected in the path of a discharging electrical current. The controller 50, which is in communication with the RCP circuit 20, is configured to detect a reverse current condition in which the electrical current (arrow i) flows away from the electric machine 14 and toward the power supply 12, i.e., a negative current. This may occur when the DC bus voltage ($V_{IN}$) on the DC voltage bus 23 exceeds the supply voltage (Vs) from the power supply 12. During such an overvoltage condition, the controller 50 transmits a control signal (arrow $CC_O$) to the RCP circuit 20 to ensure passage of the electrical current (arrow i) through the energy dissipating element 30 for the duration of the reverse current condition.

In the example embodiment of FIG. 1, the RCP circuit 20 may include a current threshold comparator circuit 22 (also labeled "i<0"), an AND logic gate 24, a semiconductor switch (S1) 25, a logic inverter 27, an overvoltage detector that may include a Zener diode 28 ($D_Z$) having a Zener voltage ($V_Z$), and a current limiting resistor ($R_1$) 33. When the DC bus voltage ($V_{IN}$) exceeds a predetermined overvoltage threshold as set by the Zener voltage ($V_Z$), i.e., the breakdown voltage of the Zerner diode 28 and the turn-on threshold voltage of the semiconductor switch S1 (e.g., 1V for a logic level MOSFET), and when at the same time the electrical current (arrow i) is detected as negative by the comparator circuit 22, i.e., the reverse current condition is active and ongoing, the RCP circuit 20 is automatically activated. When this occurs, a first voltage signal into the AND logic gate 24 is asserted true or high/1.

Similarly, a second voltage signal fed into the AND logic gate 24 from the comparator circuit 22 is either nominally 0 or 1 depending on whether a reverse current condition is present, the voltage into the AND logic gate 24 is asserted true or high/1 when the electrical current i<0, which is indicative of the reverse current condition. The master switch 18 receives a logic signal of 0 or a 0 VDC voltage signal from the logic inverter 27 for a duration in which the energy dissipating element/resistor 30 is active, and thus remains turned off under the same condition.

More specifically, by turning on the semiconductor switch 25 within the RCP circuit 20 when the voltages into the AND logic gate 24 are both 0, the energy dissipating element 30 is automatically inserted into the path of the electrical current (arrow i). The resistance value of the energy dissipating element 30 in the embodiment of FIG. 1 may be chosen such that the DC bus voltage ($V_{IN}$) remains within calibrated voltage limits. When the DC bus voltage ($V_{IN}$) falls within such voltage limits, the RCP circuit 20 is again turned off via operation of the semiconductor switch 25, with the master switch 18 turned back on to restore normal steady-state operation of the electrical system 10.

Operation in FIG. 1 and the various alternative embodiments described herein may be achieved via the controller 50. The controller 50 may be embodied as one or more computer devices and equipped with requisite memory (M) and a processor (P), as well as associated hardware and software, e.g., a clock or timer, input/output circuitry, etc. Memory (M) includes sufficient amounts of read only memory, for instance magnetic or optical memory, on which is recorded computer-readable instructions 100 embodying the processes described herein.

FIG. 2 depicts an electrical system 10A in an alternative configuration. Instead of the power dissipating resistor ($R_1$) of FIG. 1, an RCP circuit 120 uses a capacitor bank (C4) as an alternative energy dissipating element 130. The capacitor bank (C4) is switched on under certain overvoltage conditions to selectively absorb energy in the manner of the bleeding resistor ($R_B$) of FIG. 1. The semiconductor switch (S1) 25 is shown schematically as a simple on/off switching device in FIG. 2 for illustrative simplicity, but may be embodied as the MOSFET shown in FIG. 1, as IGBTs, or as other suitable semiconductor switching devices.

The RCP circuit 120 of FIG. 2 turns off the master switch 18, which may optionally include a parallel resistor ($R_3$) as shown, and switches on the semiconductor switch 25 when the DC bus voltage ($V_{IN}$) reaches a threshold voltage, e.g., 16 VDC in an example embodiment. Closing the semiconductor switch 25 charges the capacitor bank (C4) of the RCP circuit 120, with the capacitor bank (C4) sized to absorb energy/current associated with such a threshold voltage. A resistor ($R_4$) may be positioned in parallel with the capacitor bank (C4) to help discharge the capacitor bank (C4) at a desired rate before the next overvoltage event occurs. The rest of the electrical system 10A is substantially as shown in FIG. 1.

FIG. 3 is a schematic illustration of an embodiment of an electrical system 10B that dissipates energy from the electric machine 14 via selective short-circuit control. In particular, this embodiment uses gate signals (arrows 19) available to upper switches (US) and lower switches (arrow LS) of the PIM 16. In the example arrangement of FIG. 3, a set of AND logic gates 42 may be arranged as hardware devices with the upper switches (US) to intercept the gate signals (arrows 19) from corresponding gate drivers G1, G3, and G5, and a set of OR logic gates 44 may be arranged with the lower switches (LS) to intercept the gate signals (arrows 19) from corresponding gate drivers G2, G4, or G6. Although not shown for illustrative simplicity, in an alternative embodiment the AND logic gates 42 may be arranged with the lower switches (LS) and the OR logic gates 44 may be arranged with the upper switches (US). In the example embodiment of FIG. 3, the upper switches (US) and the windings of the electric machine 14 act as energy dissipating elements 230, with the upper switches (US) and the OR logic gates 42 forming an RCP circuit 220.

The RCP circuit 220 of FIG. 3 turns off the master switch 18 when the DC bus voltage ($V_{IN}$) exceeds a threshold voltage and a reverse/negative current (arrow i) is detected via the current sensor 21 and the comparator circuit 22. The RCP circuit 220 also turns on all three of the upper switches (US) in the PIM 16 while turning off all of the lower switches (LS). In other embodiments, the RCP circuit 220 may turn off the upper switches (US) and turn on the lower switches (LS), with the positions of the OR logic gates 44 and the AND logic gates 42 simply being swapped in such an embodiment. This control action effectively short-circuits designated phase windings 15 of the electric machine 14 to prevent back flow of the electrical current (arrow i) in the electrical circuit 10B.

An overvoltage condition during a reverse current may be sensed via an overvoltage detector such as the Zener diode 28 and the resistor (R1) 33, and operation of the AND logic gate 24 as shown. That is, when the DC bus voltage ($V_{IN}$) exceeds the Zener voltage ($V_Z$) and the current sensor 21 detects a reverse current condition, the AND logic gate 24 generates a nominal high voltage output (e.g., 5 VDC) to turn on the upper switches (US) of the PIM 16. The output of the AND logic gate 24 could be latched or held high for a predetermined period of time to allow the energy causing reverse current to be dissipated in the windings 15. The controller 50 may reset the AND latch to allow normal operation of the PIM 16. By action of the OR logic gates 44, this will occur even if the gate drivers G2, G4, and G6 are not actively driving the lower switches (LS) as part of the ordinary power conversion function of the PIM 16.

wherein transmitting the control signal to the RCP circuit includes transmitting the control signal to a corresponding logic gate of each of the upper switches to short the machine windings via the lower switches while the upper switches remain off.

As a result of short-circuiting, current (arrow i) is routed in a loop between the upper switches (US) or the lower switches (LS) and the phase windings 15 of the electric machine 14, depending on which of the upper or lower switches are turned on and which are turned off, with associated energy internally dissipated as heat. When the lower switches (LS) are equipped with the OR logic gates 44 as shown, the lower switches (LS) are turned on during the reverse current and overvoltage condition, while the upper switches (US) in this particular case would remain off. This action shorts the machine windings 15 via the lower switches. Though active short circuiting may result in an increase in temperature of the electric machine 14, with proper control and temperature monitoring the electric machine 14 may be effectively used to absorb excess energy present in short reverse current events causing voltage spikes on the DC bus.

As shown in FIG. 4, active short-circuiting may be achieved via an electrical system 10C having, as the controller 50 or as an additional or separate control device, a microcontroller (MC) 60. The microcontroller 60 may be used in lieu of the physical hardware-based AND logic gates 44 and OR logic gates 42 shown in FIG. 3. In such an embodiment, the microcontroller 60, as part of an RCP circuit 320, uses software programming to provide a hardware interrupt signal (arrow INTR) to control the on/off switching states of the upper and lower switches (US, LS) of the PIM 16 in essentially the same manner of FIG. 3. The embodiment of FIGS. 3 and 4 may require efforts to ensure that the electric machine 14 remains within a desired temperature limit while operating in the active short circuit state, e.g., by discontinuing the active short-circuit condition if a temperature of the electric machine 14 rises above such a limit. As an additional benefit, the microcontroller 60 can provide the input signal to the master switch 18 to connect or disconnect the power supply 12 of FIG. 1.

The embodiments of FIGS. 1-4 described above may require integration with the hardware and software of the electrical system 10, 10A, 10B, or 10C. As this may not be possible, a hardware solution may be used to achieve the same ends, e.g., by packaging the circuits shown in FIG. 5A, 5B, 6A, or 6B in a DC power connector or wiring harness connected to the DC voltage bus 23 as alternatives to the electric drive-integrated embodiments of FIGS. 1-4.

Figure 5A:
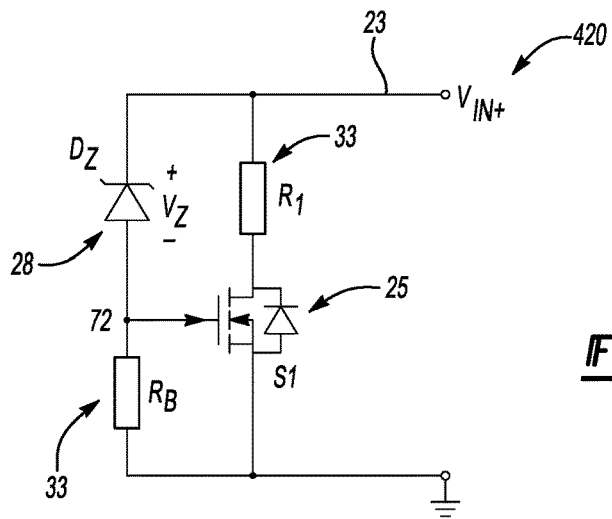
FIGS. 5A and 5B are schematic illustrations of alternative embodiments that may be implemented as part of a separate power harness on an input side of an electrical system.
Figure 5B:
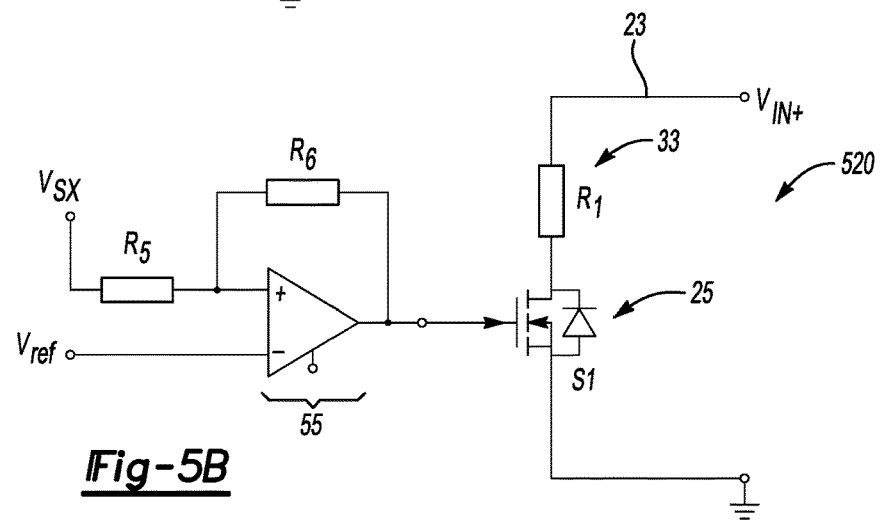

Referring first to FIGS. 5A and 5B, two possible RCP circuits 420 and 520 may be realized as hardware modules that are connectable to the supply/input side of the DC voltage bus 23, e.g., as part of a wiring harness. The RCP circuit 420 of FIG. 5A uses the power resistor ($R_1$) as a bleeding resistor to dissipate energy in a manner similar to that of the embodiment shown in FIG. 1. That is, the semiconductor switch (S1) 25 may be placed in series with the resistor ($R_1$) as the energy-dissipating element 30 noted above. The semiconductor switch 25 is turned on by a high gate signal at node 72 when the DC bus voltage sufficiently exceeds the Zener voltage ($V_Z$). In such a case, reverse current may first flow across the Zener diode 28 toward the resistor ($R_B$), acting as a pull-down resistor in this case and turning on the semiconductor switch S1, which places resistor ($R_1$) across the DC bus 23 to dissipate energy. Additional control precision may be gained over the function of the RCP circuit 420 of FIG. 5A using the RCP circuit 520 of FIG. 5B, in which the semiconductor switch (S1) 25 is driven via an operational amplifier 55 having resistors $R_5$ and $R_6$ as shown. The RCP circuit 520 may be connected across the DC voltage bus and powered via a calibrated reference voltage ($V_{REF}$) and a sensed voltage ($V_{SX}$) of the DC voltage bus 23 described above. The embodiment of FIG. 5B may be used to turn on the semiconductor switch 25 when the overvoltage condition occurs at a particular magnitude or severity.

Figure 6A:
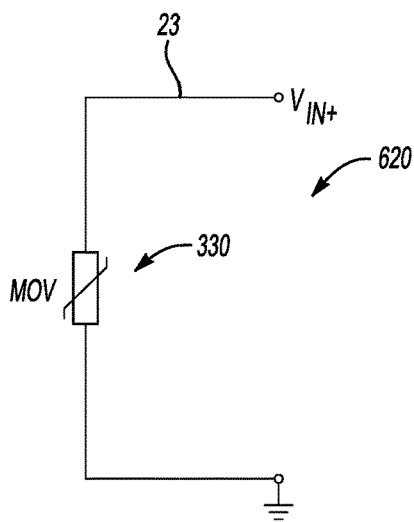
FIGS. 6A and 6B are schematic illustrations of alternative passive discharge embodiments to those shown in FIGS. 5A and 5B.
Figure 6B:
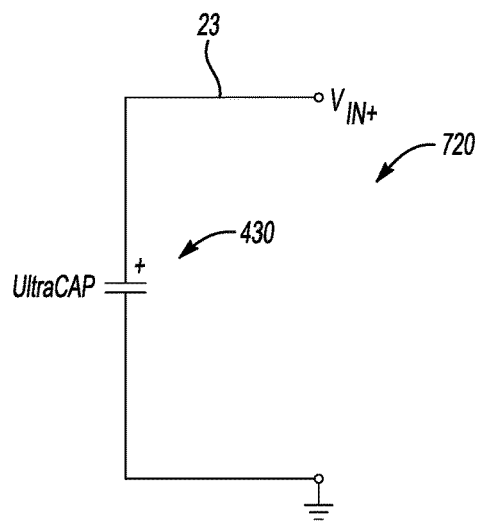

FIGS. 6A and 6B depict passive hardware embodiments of the RCP circuits 620 and 720 that may be used as alternatives to the embodiments of FIGS. 5A and 5B. In the RCP circuit 620 of FIG. 6A, a metal oxide varistor (MOV) may be connected across the DC voltage bus 23 and used as an energy dissipating element 330. Similarly, in the RCP circuit 720 of FIG. 6B, an ultra-capacitor may be connected across the DC voltage bus 23 and used as an energy dissipating element 430. The nominal operating voltage, clamping voltage, and energy ratings for the MOV of FIG. 6A and the capacitance of the ultra-capacitor of FIG. 6B are carefully chosen to provide the required rate and level of energy dissipation in response to an overvoltage/reverse current condition. In terms of relative benefits, the lower voltage clamping precision of the embodiment of FIG. 6A may be improved, albeit at the expense of additional mass and component cost, by using the embodiment of FIG. 6B.

The selectively controlled energy dissipating approach detailed above allows a methodology for improving the overall quality of the electrical system 10 of FIG. 1 and the alternative embodiments of FIGS. 2-6B in response to a reverse current condition. The embodiments handle overvoltage by selectively connecting a dissipating element or elements in the path of a reverse current when the DC bus voltage ($V_{IN}$) exceeds a predetermined limit. Other embodiments selectively short the motor windings of the electric machine 14 to prevent reverse current flow, e.g., during a regenerative braking event or when the electric machine tries to reverse direction or when speed of the electric machine 14 exceeds the no-load speed when the switches of the PIM 16 are off. Yet other embodiments may be implemented purely in hardware as part of a wiring harness. However, the disclosed embodiments are intended to maintain a DC bus voltage at acceptable levels, while helping to prevent premature failure of components of the electrical system 10.

While the best modes for carrying out the disclosure have been described in detail, those familiar with the art to which this disclosure relates will recognize various alternative designs and embodiments for practicing the disclosure within the scope of the appended claims.

What is claimed is:

1. An electrical system comprising:
   a direct current (DC) voltage bus;
   a power supply providing a supply voltage to the DC voltage bus;
   an electric machine connected to the power supply via the DC voltage bus;
   a reverse current protection (RCP) circuit positioned between the power supply and the electric machine, the RCP circuit including an energy dissipating element; and
   a controller in communication with the RCP circuit that is configured to detect a reverse current condition of the electric system in which an electrical current flows from the electric machine toward the power supply when an induced voltage of the electric machine exceeds a voltage level of the DC voltage bus, wherein the controller is configured to transmit a control signal to the RCP circuit so as to direct the electrical current through the energy dissipating element for a duration of the reverse current condition.

2. The electrical system of claim 1, further comprising a master switch configured to selectively connect or disconnect the power supply to the DC voltage bus, wherein the controller is programmed to open the master switch and thereby disconnect the power supply from the DC voltage bus for the duration of the reverse current condition.

3. The electrical system of claim 1, wherein the energy dissipating element includes a resistor.

4. The electrical system of claim 1, wherein the energy dissipating element includes a capacitor bank.

5. The electrical system of claim 1, further comprising a polyphase power inverter module (PIM) that is electrically connected to the DC voltage bus and the electric machine, the polyphase PIM having a number of upper semiconductor switches and a number of lower semiconductor switches equal to a number of phases of the electric machine, wherein the electric machine includes phase windings and the energy dissipating element includes the phase windings of the electric machine along with the upper semiconductor switches or the lower semiconductor switches.

6. The electrical system of claim 5, further comprising a plurality of OR logic gates each connected to a respective gate driver and a latching AND logic gate providing a voltage signal to each of the OR logic gates in response to detection of the reverse electrical current condition and a voltage level of the DC bus exceeding a predetermined overvoltage threshold, the voltage signal being configured to turn on all of the lower semiconductor switches to prevent the reverse current into the DC bus.

7. The electrical system of claim 6, the RCP circuit including a Zener diode having an anode that is connected to the AND logic gate to detect when the induced voltage of the electric machine exceeds a predetermined overvoltage threshold.

8. The electrical system of claim 1, wherein the controller is a microcontroller connected to a respective gate driver of each of the semiconductor switches of the PIM, and wherein the microcontroller is configured to turn on the upper semiconductor switches and turn off the lower semiconductor switches of the PIM in response to the detection of the reverse electrical current condition when the induced voltage of the electric machine exceeds a voltage level of the DC voltage bus.

9. The electrical system of claim 1, further comprising a DC power connector, wherein the RCP circuit is packaged within the DC power connector.

10. The electrical system of claim 9, wherein the RCP circuit includes, as the energy dissipating device, a semiconductor switch in series with a power resistor, and further includes one of: a Zener diode and an operational amplifier, wherein the semiconductor switch has a gate connected to an anode of the Zener diode or an output of the operational amplifier.

11. The electrical system of claim 9, wherein the RCP circuit includes a metal-oxide-varistor as the energy dissipating element.

12. The electrical system of claim 9, wherein the RCP circuit includes an ultra-capacitor as the energy dissipating element.

13. The electrical system of claim 1, wherein the electric machine is connected to a drive axle of a vehicle and configured to generate torque at a level suitable for propelling the vehicle.

14. The electrical system of claim 1, wherein the electric machine is connected to a hydraulic brake boost system of a vehicle, and is configured to generate a braking force at a level suitable for slowing the vehicle during a braking maneuver.

15. A method for protecting an electrical system from a reverse current condition, the electric system having a direct current (DC) voltage bus, a power supply providing a supply voltage to the DC voltage bus, an electric machine connected to the power supply via the DC voltage bus, and a reverse current protection (RCP) circuit positioned between the power supply and the electric machine that includes an energy dissipating element, the method comprising:

detecting, via a controller, a reverse current condition of the electric system in which an electrical current flows from the electric machine toward the power supply when an induced voltage of the electric machine exceeds a voltage level of the DC voltage bus sensed by an overvoltage detection circuit with a predetermined overvoltage threshold;

opening a master switch to selectively disconnect the power supply from the DC voltage bus for a duration of the detected reverse current condition; and transmitting a control signal to the RCP circuit via the controller to direct a flow of the electrical current, via operation of the RCP circuit, through the energy dissipating element for a duration of the reverse current condition.

16. The method of claim 15, wherein the energy dissipating element includes a bleeding resistor or a capacitor bank, and wherein transmitting the control signal to the RCP circuit includes transmitting the control signal to a logic gate of a semiconductor switch.

17. The method of claim 15, wherein the electrical system further includes a polyphase power inverter module (PIM) that is electrically connected to the DC voltage bus and the polyphase electric machine, the PIM having a plurality of upper semiconductor switches and a plurality of lower semiconductor switches, wherein transmitting the control signal to the RCP circuit includes transmitting the control signal to a corresponding logic gate of the upper or lower switches such that the corresponding upper or lower switches act as the energy dissipating elements in conjunction with windings of the polyphase electric machine.

18. The method of claim 17, wherein transmitting the control signal to the RCP circuit includes transmitting the control signal to a corresponding logic gate of each of the upper switches to short the machine windings via the lower switches while the upper switches remain off.

19. The method of claim 17, wherein transmitting the control signal to the RCP circuit includes transmitting the control signal to a corresponding logic gate of each of the lower switches to short the machine windings via the upper switches while the lower switches remain off.

* * * * *